US006633144B2

(12) United States Patent
Barker et al.

(10) Patent No.: US 6,633,144 B2
(45) Date of Patent: Oct. 14, 2003

(54) SYSTEM AND METHOD FOR MEASURING PARAMETERS OF A DC MOTOR FIELD

(75) Inventors: Sidney A. Barker, Troutville, VA (US); Eddy Ying Yin Ho, Torrance, CA (US)

(73) Assignee: General Electric Co., Schenectady, NY (US)

( * ) Notice: Subject to any disclaimer, the term of this patent is extended or adjusted under 35 U.S.C. 154(b) by 82 days.

(21) Appl. No.: 09/683,424

(22) Filed: Dec. 27, 2001

(65) Prior Publication Data

US 2003/0122513 A1 Jul. 3, 2003

(51) Int. Cl.[7] .................................................. H02P 7/06
(52) U.S. Cl. ....................... 318/254; 318/138; 318/439; 318/251; 388/801; 388/803; 388/806; 388/907.2; 388/917
(58) Field of Search ................................. 318/138, 254, 318/439, 251; 388/801, 806, 803, 907.2, 917

(56) References Cited

U.S. PATENT DOCUMENTS

| | | | | |
|---|---|---|---|---|
| 3,906,317 A | * | 9/1975 | Narita ......................... | 318/246 |
| 3,983,466 A | | 9/1976 | Safiuddin .................... | 318/338 |
| 4,011,489 A | | 3/1977 | Franz et al. ................. | 318/227 |
| 4,023,083 A | | 5/1977 | Plunkett ...................... | 318/227 |
| 4,079,301 A | | 3/1978 | Johnson, III ................ | 318/338 |
| 4,282,473 A | | 8/1981 | Dreiseitl et al. ............ | 318/803 |
| 4,431,957 A | | 2/1984 | Chausse et al. ............. | 318/805 |
| 4,451,770 A | | 5/1984 | Boettner et al. ............ | 318/757 |
| 4,549,122 A | | 10/1985 | Berkopec et al. ........... | 318/338 |
| 4,558,264 A | * | 12/1985 | Weischedel .................. | 318/254 |
| 5,137,119 A | * | 8/1992 | Horbruegger et al. ...... | 187/112 |
| 5,260,863 A | * | 11/1993 | Ackermann et al. .......... | 363/88 |
| 5,859,518 A | * | 1/1999 | Vitunic ........................ | 318/701 |
| 5,878,189 A | * | 3/1999 | Lankin et al. ............... | 388/801 |
| 6,262,550 B1 | | 7/2001 | Kliman et al. .............. | 318/565 |
| 6,278,623 B1 | | 8/2001 | Garces et al. ................. | 363/46 |

* cited by examiner

Primary Examiner—Robert E. Nappi
Assistant Examiner—Rina I. Duda
(74) Attorney, Agent, or Firm—Karl Vick; Kevin Duncan; Hunton & Williams LLP

(57) ABSTRACT

A system and method determine the parameters of a field of a DC motor. The method comprises obtaining parameters of the DC motor; and performing an iterative processing loop, the iterative processing loop being performed n times. The iterative processing loop includes regulating field current based on the parameters of the DC motor, and calculating a field resistance from a field voltage and the field current measured during the regulating of the field current; operating in a closed loop mode to determine a first field firing angle and a second field firing angle; operating in an open loop mode to determine a first time constant and a second time constant based on applying the first field firing angle and the second field firing angle; and determining at least one parameter of the field of the DC motor based on the first time constant, the second time constant, and the calculated field resistance.

21 Claims, 5 Drawing Sheets

SYSTEM AND METHOD FOR MEASURING PARAMETERS OF A DC MOTOR FIELD

BACKGROUND OF THE INVENTION

The system and method of the invention relate to the measurement of parameters of a DC motor, and more particularly, to parameters of a field of a DC motor.

DC motors are commonly used in a variety of applications in a variety of operating environments. A DC motor may be described as having two components. These two components include a stationary part, which may be characterized as a stator, and a moving part that rotates, which is typically characterized as an armature. The armature is disposed inside the stator. There are typically four terminals, or connections to the motor. Two of the connections are to the motor's armature through a method which allows transfer of electrical energy to the rotating part of the motor. The other two connections are to the motor's field coils, which reside in the stator, or stationary part of the motor.

As a voltage is applied to the armature terminal of the dc motor, and another voltage is applied to the field terminals of the motor, currents flow in the armature and field coils to produce a magnetic field that serves to attract or repel the armature.

As a result, the armature spins within the stator. The armature is connected to and supported by a shaft of the motor. Accordingly, the spinning of the armature results in the spinning of the shaft. The shaft extends outside of the motor and connects to the equipment to be rotated. These components including the stator and armature of a DC motor have various operating characteristics, such as armature inductance and resistance, and field inductance and resistance characteristics. Some characteristics of a DC motor may be given by the manufacturer of the motor. However, other characteristics may need to be measured during commissioning of the DC motor, i.e., during the initial set up of the DC motor, in the particular environment in which the DC motor will operate.

DC motors are typically controlled by a control system. In order that the control system accurately control a DC motor, the various characteristics of the DC motor should be determined. For example, parameters relating to the nature of the motor's armature need to be determined to allow for proper control of the motor. In addition, another set of parameters relating to the nature of the motor's field must be determined for proper control of field current during normal motor operation. Among these field parameters are field resistance as well as inductance parameters. In addition, for some motor applications, it is necessary to further know the characteristics of the motor field to the extent that the magnetic field produced at various field currents is known. This relationship between field current and resulting magnetic field (flux) can be plotted with current on one axis and flux on the other axis. It is typically called a flux curve.

There are various known methods for determining the parameters of a DC motor field However, these methods typically require that the shaft of the motor be allowed to rotate during the testing to determine the characteristics of the DC motor field. In this situation, it is often necessary to disconnect equipment in order that the shaft be free to rotate. This disconnection of equipment is also time consuming, and at times, not feasible, as should be appreciated. Accordingly, these and other shortcomings exist with known processes for measuring the operating parameters of a DC motor.

BRIEF SUMMARY OF THE INVENTION

In accordance with one embodiment of the invention, a method determines the parameters of the field of a DC motor. The method comprises obtaining parameters of the DC motor; and performing an iterative processing loop, the iterative processing loop being performed n times. The iterative processing loop includes regulating field current based on the parameters of the DC motor, and calculating a field resistance from a field voltage and the field current measured during the regulating of the field current; operating in a closed loop mode to determine a first field firing angle and a second field firing angle; operating in an open loop mode to determine a first time constant and a second time constant based on applying the first field firing angle and the second field firing angle; and determining at least one parameter of the field of the DC motor based on the first time constant, the second time constant, and the calculated field resistance.

In accordance with a further aspect of the invention, the invention provides a system for determining at least one parameter of a field of a DC motor, the system comprising: a processing portion that obtains parameters of the DC motor, the processing portion performing an iterative processing loop, the iterative processing loop being performed n times, the iterative processing loop including: regulating field current based on the parameters of the DC motor, and calculating a field resistance from a field voltage and the field current measured during the regulating of the field current; operating in a closed loop mode to determine a first field firing angle and a second field firing angle; operating in an open loop mode to determine a first time constant and a second time constant based on applying the first field firing angle and the second field firing angle; and determining at least one parameter of the field of the DC motor based on the first time constant, the second time constant, and the calculated field resistance.

In accordance with a further aspect of the invention, the invention provides a system for determining at least one parameter of a field of a DC motor, the system comprising: means for obtaining parameters of the DC motor; and means for performing an iterative processing loop, the iterative processing loop being performed n times, the iterative processing loop including: regulating field current based on the parameters of the DC motor, and calculating a field resistance from a field voltage and the field current measured during the regulating of the field current; operating in a closed loop mode to determine a first field firing angle and a second field firing angle; operating in an open loop mode to determine a first time constant and a second time constant based on applying the first field firing angle and the second field firing angle; and determining at least one parameter of the field of the DC motor based on the first time constant, the second time constant, and the calculated field resistance.

In accordance with a further aspect of the invention, the invention provides a method for determining at least one parameter of a field of a DC motor, the method comprising: obtaining parameters of the DC motor; and performing an iterative processing loop, the iterative processing loop being performed n times. The iterative processing loop includes regulating field current based on the parameters of the DC motor, and calculating a field resistance from a field voltage and the field current measured during the regulating of the field current; operating in a closed loop mode to determine a first field firing angle and a second field firing angle, the operating in a closed loop mode including: regulating the current to a first high point current and measuring a first field firing angle required to obtain the first high point current; and regulating the current to a first low point current and measuring a second field firing angle required to obtain the first low point current; operating in an open loop mode to determine a first time constant and a second time constant based on applying the first field firing angle and the second field firing angle, the operating in an open loop mode including: setting an open loop firing command to the second field firing angle; stepping the open loop firing command to the first field firing angle and measuring the first time constant based on field current rate of change; and stepping the open loop firing command back to the second field firing angle and measuring the second time constant based on field current rate of change. The method further includes determining at least one parameter of the field of the DC motor based on the first time constant, the second time constant, and the calculated field resistance.

In accordance with a further aspect of the invention, the invention provides a system for determining at least one parameter of a field of a DC motor, the system comprising a processing portion that obtains parameters of the DC motor, the processing portion performing an iterative processing loop, the iterative processing loop being performed n times, the iterative processing loop including: regulating field current based on the parameters of the DC motor, and calculating a field resistance from a field voltage and the field current measured during the regulating of the field current; operating in a closed loop mode to determine a first field firing angle and a second field firing angle, the operating in a closed loop mode including: regulating the current to a first high point current and measuring a first field firing angle required to obtain the first high point current; and regulating the current to a first low point current and measuring a second field firing angle required to obtain the first low point current; operating in an open loop mode to determine a first time constant and a second time constant based on applying the first field firing angle and the second field firing angle, the operating in an open loop mode including: setting an open loop firing command to the second field firing angle; stepping the open loop firing command to the first field firing angle and measuring the first time constant based on field current rate of change; and stepping the open loop firing command back to the second field firing angle and measuring the second time constant based on field current rate of change; and determining at least one parameter of the field of the DC motor based on the first time constant, the second time constant, and the calculated field resistance.

In accordance with a further aspect of the invention, the invention provides a system for determining at least one parameter of a field of a DC motor, the system comprising: means for obtaining parameters of the DC motor; and means for performing an iterative processing loop, the iterative processing loop being performed n times, the iterative processing loop including: regulating field current based on the parameters of the DC motor, and calculating a field resistance from a field voltage and the field current measured during the regulating of the field current; operating in a closed loop mode to determine a first field firing angle and a second field firing angle, the operating in a closed loop mode including: regulating the current to a first high point current and measuring a first field firing angle required to obtain the first high point current; and regulating the current to a first low point current and measuring a second field firing angle required to obtain the first low point current; operating in an open loop mode to determine a first time constant and a second time constant based on applying the first field firing angle and the second field firing angle, the operating in an open loop mode including: setting an open loop firing command to the second field firing angle; stepping the open loop firing command to the first field firing angle and measuring the first time constant based on field current rate of change; and stepping the open loop firing command back to the second field firing angle and measuring the second time constant based on field current rate of change; and determining at least one parameter of the field of the DC motor based on the first time constant, the second time constant, and the calculated field resistance.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Figure 1:
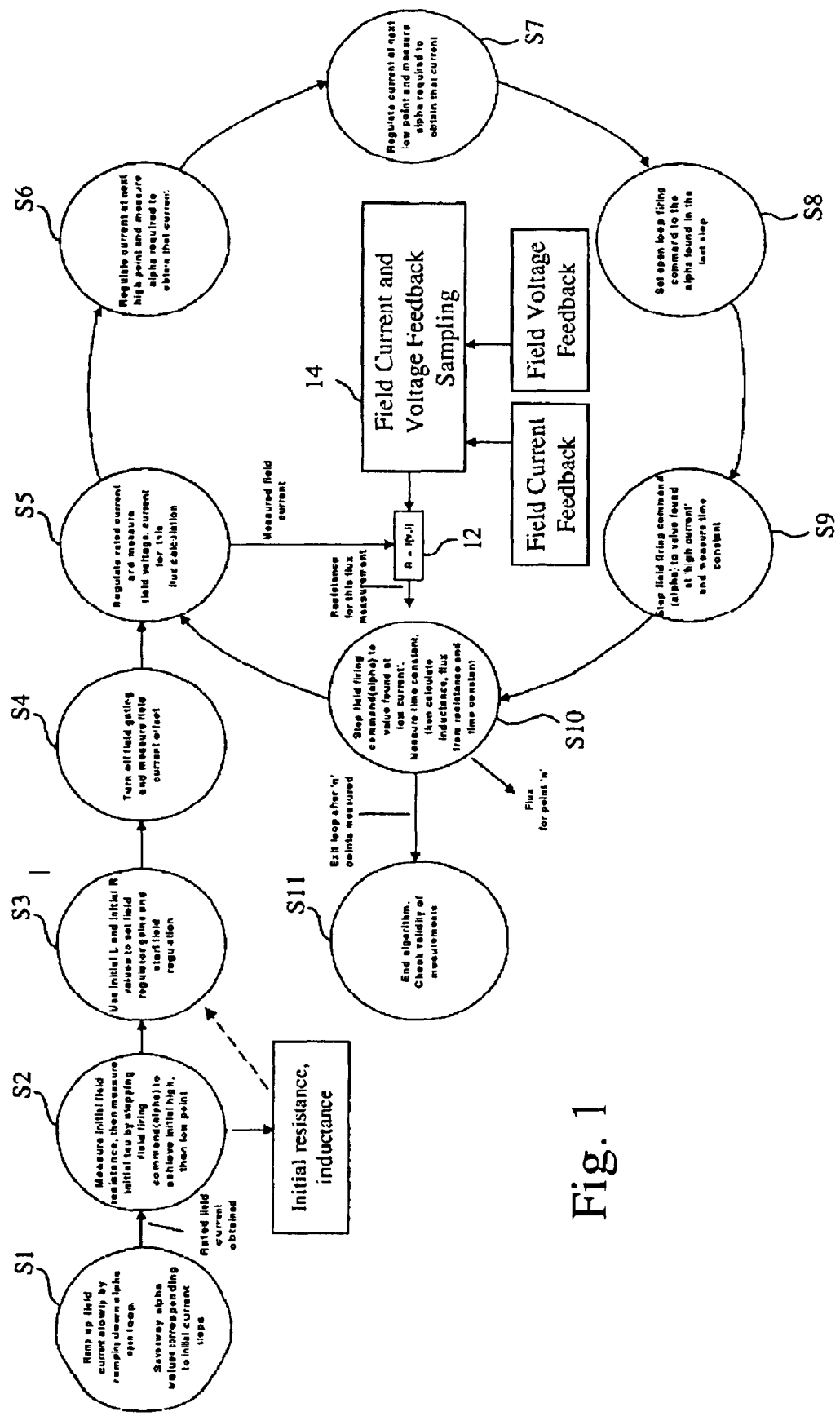
FIG. 1 is a flow chart showing a process for measuring the parameters of a DC motor field in accordance with one embodiment of the system and method of the invention.

Hereinafter, aspects of the systems and methods for measuring parameters of a DC motor in accordance with various embodiments of the invention will be described. As used herein, any term in the singular may be interpreted to be in the plural, and alternatively, any term in the plural may be interpreted to be in the singular.

The system and method of the invention are directed to the above stated problems, as well as other problems, that are present in conventional techniques. The foregoing description of various products, methods, and apparatus and their attendant disadvantages is in no way intended to limit the scope of the present invention, or to imply that the present invention does not include some or all of the various elements of the products, methods, and apparatus in one form or another. Indeed, various embodiments of the invention may be capable of overcoming some of the disadvantages noted herein, while still retaining some or all of the various elements of the products, methods, and apparatus in one form or another.

The system and method of the invention provide for the accurate measurement of the parameters of a DC motor field. The process of the invention provides for such measurement without the necessity to lock, or alternatively to rotate, the motor shaft during the testing. In accordance with one embodiment of the invention, the process utilizes a combination of a field current regulator and open loop firing commands to determine time constants between various field current points. These time constants are then used in the testing process. In particular, the process of the invention accurately measures several flux points for the field of the particular DC motor being tested.

The process provides accurate information relating to the parameters of the DC motor including flux parameters, inductance parameters and field resistance parameters, for example. That is, the system and method of the invention provides for the measurement of field resistance and a determination of a flux curve that characterizes the parameters of the DC motor. In accordance with some embodiments of the invention, the process of the invention may be utilized to obtain accurate field data without any given data except rated field current. Accordingly, even with an undetermined stability for a field current regulator, the process of the invention may perform an "open loop" ramp up of the field current in a stable manner. Based on the initial data found during this ramp up of the field current, the process of the invention performs an estimation of field resistance and a variety of measured time constants. These measured parameters allow for a set up of stable operation of a field current regulator.

This stable set up of the field current regulator is then used periodically during the remainder of the process of the invention. That is, the stable current regulator is thereafter used several times to step through a series of current points. A measurement of the firing angle is made at each of these points. The process in accordance with some embodiments of the invention uses these measured firing angles to step from one current point to another. As a result, the process measures an incremental time constant between each set of current points. The time constant for each step is used, along with resistance measurements taken prior to each current step, to calculate incremental flux measurements. This "current regulator assisted" measurement of resistance allows for an accurate measurement of flux even in the situation of a cold motor whose resistance is changing with time.

FIG. 1 is a flow chart showing the process in accordance with one embodiment of the invention. It should be appreciated that FIG. 1 shows an illustrative sequence of process steps. However, it should be appreciated that other sequences could be utilized. In particular, FIG. 1 illustrates the combinational use of a field current regulator, closed loop regulation measurements, and an open loop gating commands obtained from the closed loop regulation measurements.

Figure 2:
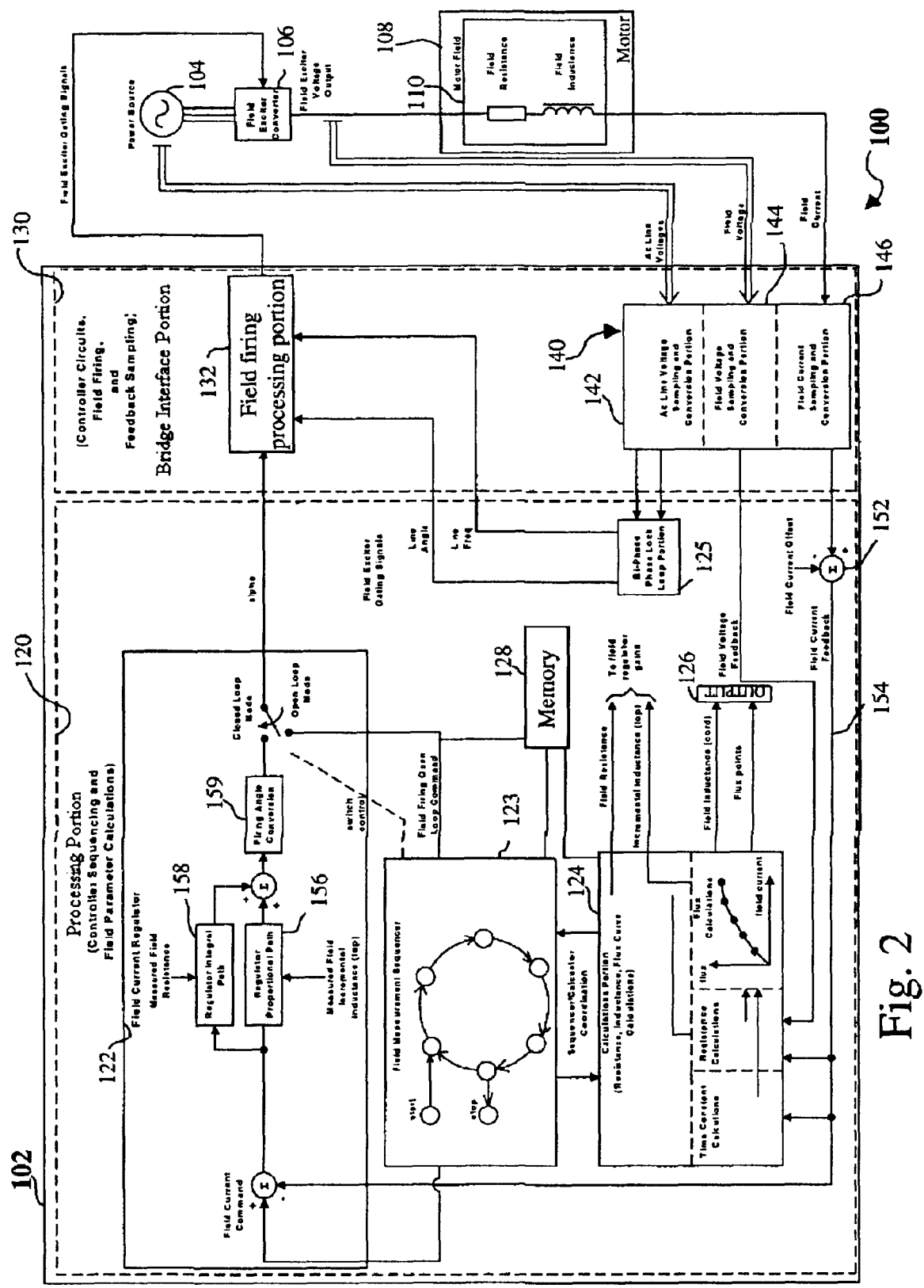
FIG. 2 is a block diagram showing a field measurement system in accordance with one embodiment of the invention.

The process of FIG. 1 will be described below in conjunction with FIG. 2. FIG. 2 is a block diagram showing a field measurement system 1 00 in accordance with one embodiment of the system and method of the invention. The field measurement system 100 includes a controller 102. Further, the field measurement system 100 includes a power source 104, a field exciter converter 106 and a motor 108. The motor 108 includes a motor field 110 as shown in FIG. 2. Utilizing the process of the invention, the controller 102 may determine the characteristics of the motor field 110.

The controller 102 includes various components as shown in FIG. 2. The controller 102 includes a processing portion 120 and a bridge interface portion 130. The processing portion 120 performs controller sequencing and field parameter calculations. Further, the bridge interface portion 130 includes controller circuits, performs field firing, and performs feedback sampling. The processing portion 120 may be in communication with the bridge interface portion 130 in any suitable manner. Accordingly, for example, it should be appreciated that the processing portion 120 and the bridge interface portion 130 do not have to be in the same geographical location. The controller 102, utilizing the processing portion 120 and the bridge interface portion 130, operates to determine the characteristics of the motor field 110 in the motor 108.

The processing portion 120 includes a field current regulator 122, a field measurement sequencer 123, a calculations portion 124 and a bi-phase lock loop portion 125. The field measurement sequencer 123, working in conjunction with the other components of the controller 102, performs the processing steps shown in FIG. 1, in accordance with one embodiment of the invention. Further, the processing portion 120 includes an output portion 126. The calculations portion 124 outputs information, which has been generated by the calculations portion 124, to the output portion 126. This information, for example, includes field inductance information, as well as flux point information. This information may then be used throughout the life of the motor 108.

As is described above, the bridge interface portion 130 includes controller circuits and performs field firing and feedback sampling. The bridge interface portion 130 includes a field firing processing portion 132 that contains a field firing algorithm.

The field firing processing portion 132 specifically controls firing of the motor field, working in conjunction with the field exciter converter 106, shown in FIG. 2.

The bridge interface portion 130 further includes a sampling portion 140. The sampling portion 140 includes an AC line voltage sampling and conversion portion 142, a field voltage sampling and conversion portion 144, and a field current sampling and conversion portion 146. The AC line voltage sampling and conversion portion 142 obtains AC line voltage input from the power source 104, as shown in FIG. 2. Further, the field voltage sampling and conversion portion 144 obtains field voltage sampling from the output of the field exciter converter 106, i.e., the input to the motor 108. Further, the field current sampling and conversion portion 146 samples field current from the motor field 110. Further operations of the sampling portion 140 and its interaction with the processing portion 120 will be described in further detail below.

In accordance with one embodiment of the invention, the controller 102 utilizes a combination of open loop field firing operation and closed loop field current regulator operation to determine the desired parameters of the motor field 110, using iterative loops of a portion of the process for different current points to obtain corresponding flux points. Accordingly, these two modes are utilized in conjunction with each other, i.e., first the closed mode and then the open mode. Data is learned from the closed loop mode of the process, which in turn allows accurate stepping of field firing commands in the open loop mode to obtain a particular current. As a result, this processing allows for a stable closed loop mode to operate.

Hereinafter, further aspects of the process of FIG. 1, in conjunction with operation of the field measurement system 100 shown in FIG. 2, will be described. It should be appreciated that the field measurement system 100 of FIG. 2 illustrates one exemplary operating system. However, it should be appreciated that other operating systems may be utilized to perform the process of the invention. For example, it should be appreciated that multiple components shown in FIG. 2 might be combined into a single component so as to perform the processing of the invention. Alternatively, for example, a single component as shown in FIG. 2 might be separated into multiple components so as to perform the processing of the invention.

In accordance with one embodiment of the invention, the process includes inputting initial information. This initial information may include, for example, field rated amps, field minimum amps, motor rated power, nominal Field AC input voltage, and phase relationship of Field AC input voltage with the main DC bridge AC input voltage. Further, it should be appreciated that a user may input a value for field resistance. If the user does not provide a value for field resistance, the controller 102 may perform a preliminary estimate of the field resistance using "field rated amps" and "motor rated power". In either case, the value of field resistance found by the controller 102 is used later in the process, as described below.

As shown in FIG. 1, the process is initiated by the field measurement sequencer 123 in step S1. In step S1, the process ramps up field currents slowly by ramping down the field firing command (alpha) open loop. Thereafter, the process saves the alpha values corresponding to the initial current steps. These alpha values are later used in S2. The alpha values may be saved in any suitable manner, such as by utilizing a memory 128, as shown in FIG. 2.

To explain further with reference to FIG. 2, the field measurement sequencer 123, working in conjunction with the field current regulator 1 22, ramps a field firing angle command in an open loop mode. This ramping is performed at a rate slow enough for a motor field of extremely long time constants. It should be appreciated that the field current regulator 122 does not have to be tuned at this point in the process. The field measurement sequencer 123 extracts alpha firing commands for two different current points during the slow ramp-up of current. These two field current points are the two highest current values, i.e., of the "n" values of current provided. The two firing angles may then be used later to step the field current between the two levels in the open loop mode. Accordingly, as illustrated in FIG. 1, rated field current is obtained as a process passes from step S1 to step S2.

Figure 5:
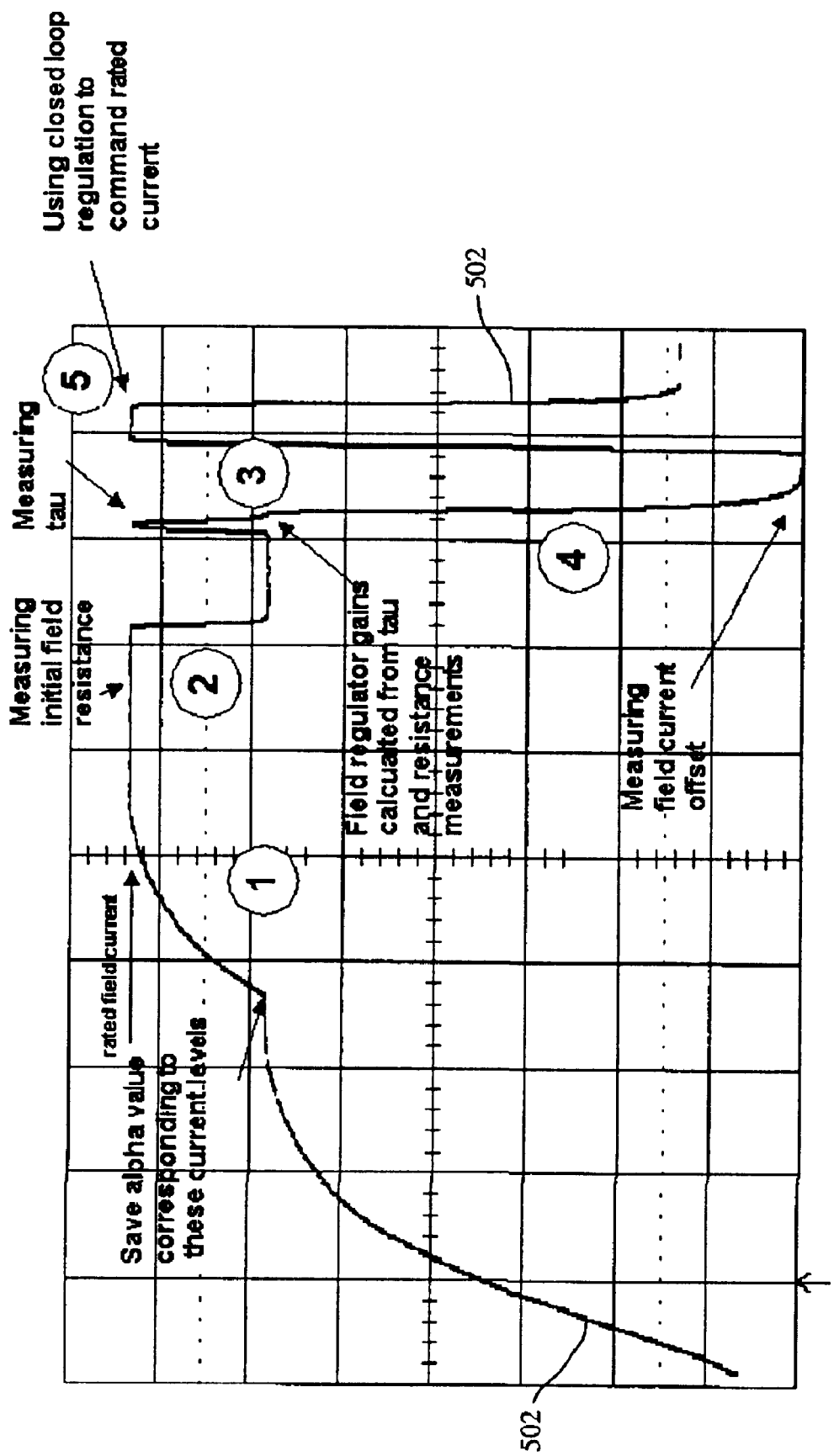
FIG. 5 is a representative scope tracing showing aspects of the measurement process in accordance with one embodiment of the invention.

FIG. 5 is a representative scope tracing 502 showing aspects of the measurement process in accordance with one embodiment of the invention. That is, FIG. 5 shows steps S1–S5 of FIG. 1, as described herein. The scope tracing 502 shows the variance of field current as the process advances through steps S1 to s5. As shown in FIG. 5, the numbered circles correspond to the steps of FIG. 1 during the process.

As shown in the flow chart of FIG. 1, in step S2, the process measures the initial field resistance at rated field current, and then measures an initial "tau," i.e., a time constant value, by stepping the field firing command (alpha) between the two values found in S1 to achieve an initial high, then low point current. To explain step S2 in further detail, once rated current is reached by the open loop process of step S1, the controller 102 measures field current and field voltage in order to obtain an initial field resistance. The controller 102 then steps down field current to the lowest point found in step S1 of the process utilizing an open loop firing command. The controller 102 then steps current up, and then back down again, so that two time constant measurements can be made. The average of these time constant measurements, along with the initial resistance measurement, is used to calculate an initial inductance measurement. This initial inductance measurement is performed by the calculations portion 124 in the processing portion 120. It should be appreciated that this processing provides an estimate of the "top incremental inductance."

After step S2 in the process of FIG. 1, the process passes to step S3. In step S3, the process uses the initial inductance (L) and initial resistance (R) values to set field regulator gains and start field regulation. To explain step S3 further, after initial field resistance and estimated incremental inductance values are obtained, these values are utilized by the processing portion 120 to make gain calculations for the field current regulator 122. Specifically, the calculations portion 124 generates the gain calculations for the field current regulator 122. The field current regulator 122 is enabled using these gains. This enablement of the field current regulator 122 in closed loop mode is used periodically throughout the rest of the test process, as is described in further detail below. After step S3, the process passes to step S4.

In step S4 as shown in FIG. 1, the process turns off the field gating and measures the field current offset. More specifically, the controller 102, in step S4, turns the field current regulator 122, as well as the field firing processing portion 132, off. As a result, the motor field 110 is allowed to decay for an amount of time based on the initial estimated incremental inductance and initial resistance measurements. Further, after an appropriate delay, the processing portion 120 measures the field current offset and applies that field current offset to the field current feedback measurement as illustrated in the summing junction 152 (FIG. 2). That is, the processing portion 120 receives a sampling from the field current sampling and conversion portion 146, and combines that sampling with the field current offset in the summing junction 152. Thereafter, the generated field current feedback 154 is generated for further processing in the processing portion 120.

After step S4, the process passes to step 55. Upon initiating step S5, an iterative loop is initiated as shown in FIG. 1. That is, steps 5–10 as shown in FIG. 1 are repeated in order to generate multiple flux values. This iterative process, which is controlled by the field measurement sequencer 123, may be repeated as many times as is desired to obtain a reasonable number of field flux points corresponding to the same number of field current points. That number may be determined by current and voltage feedback resolution and the desired refinement of the estimation of the flux curve. Four to six points might illustratively be considered to be a typical number.

Figure 3:
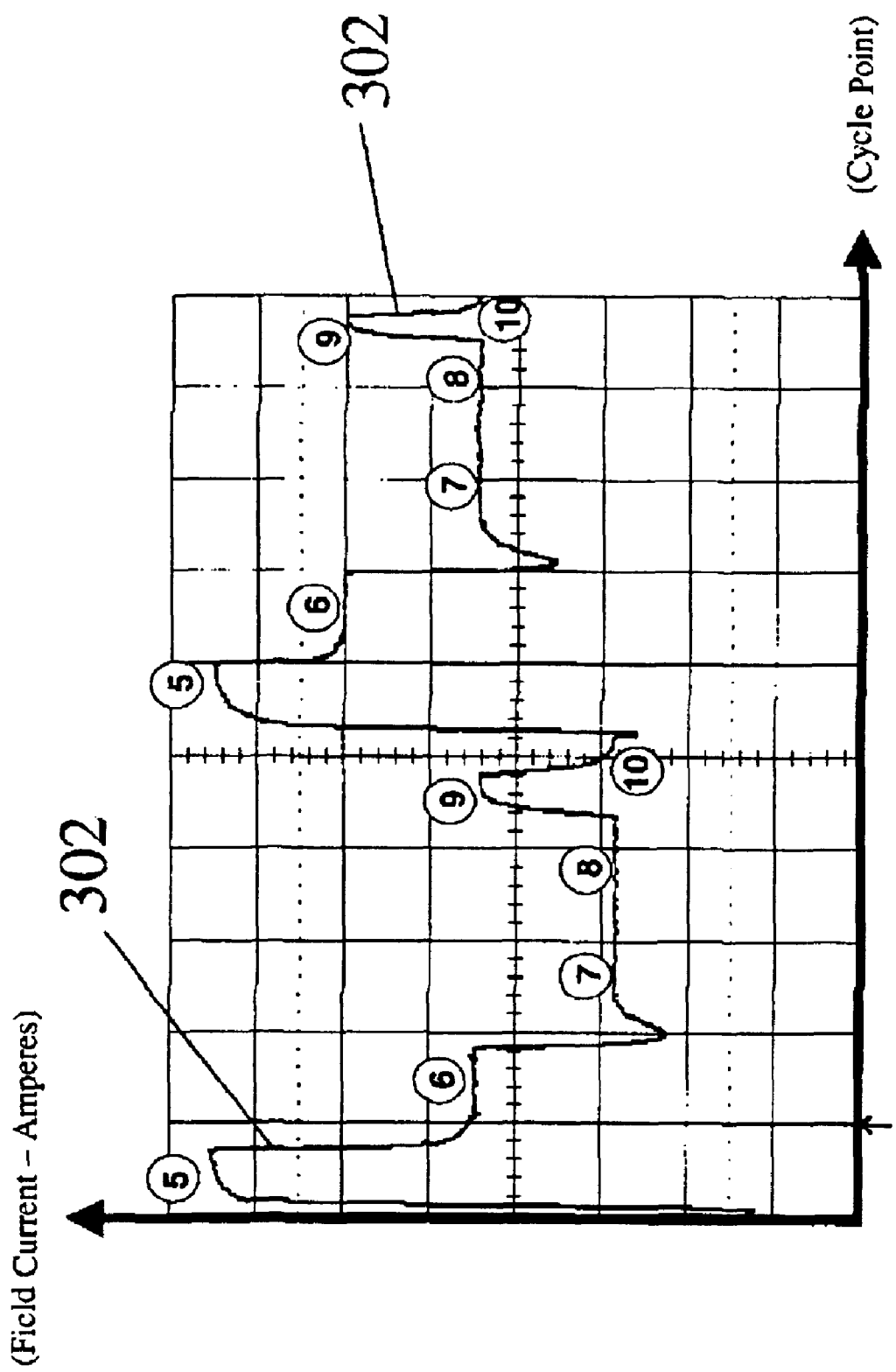
FIG. 3 is a representative scope tracing showing two cycles of the measurement process in accordance with one embodiment of the invention.

FIG. 3 is a representative scope tracing 302 showing two complete cycles of the, measurement process in accordance with one embodiment of the invention. That is, FIG. 3 shows steps S5–S10 of FIG. 1 being repeated two times. The scope tracing 302 shows the variance of field current as the process advances through steps 5–10. As shown in FIG. 3, the numbered circles correspond to the steps of FIG. 1 during the iterative process. Note that S5, S6 and S7 generally use the field firing regulator in closed loop mode, while S8, S9, and S10 generally use the open loop mode.

The iterative process begins with step S5 as shown in FIG. 1. In step S5, the process regulates rated current, and measures field voltage and current for a particular flux calculation. To explain further, the field measurement sequencer 123, in step S5, turns the field current regulator 122 back on with a reference equal to rated field current, i.e., the highest of the "n" current points. When rated field current is obtained, measurements of field voltage are obtained by the field voltage sampling and conversion portion 144. Also, field current feedback is obtained by the field current sampling and conversion portion 146. Further, a calculation of resistance is performed by the calculation portion 124 utilizing this feedback. The resistance calculation performed by the calculation portion 124 will be used along with the upcoming time constant measurement, described below, to calculate an incremental inductance and incremental flux between the two current points being measured. It should be appreciated that each pass of the loop, i.e., steps 5–10 as shown in FIG. 1, will result in an incremental flux measurement which is valid for the incremental range of the curve between the "low point" and the "high point." After step S5, the process passes to step S6. The calculation of field resistance is simply the measured field voltage divided by the measured field current. This calculation may be provided by the representative processing portions (12, 14) as shown in FIG. 1. Further, it should be appreciated that the field voltage might be obtained using a suitable estimation process, as is desired, such that an estimated field voltage is obtained. This would in turn allow the calculation of the field resistance.

It should be noted that field resistance will change somewhat throughout the duration of the test as the field windings heat up. This is especially true if the motor has not warmed up prior to the test. For this reason, field resistance is measured each pass of the loop so as to later calculate an accurate time constant for the particular step in field current.

In step S6, the process regulates the current at the next high point and measures the alpha value required to obtain that current. To explain, the field measurement sequencer 123, in step S6 of the process, gives the current regulator 122 a reference equal to the next "high point" to which field current will be stepped in the motor field 110. When that field current is obtained in the motor field 110, the field current is measured along with the field firing angle (alpha value) required to achieve the current. The Field Measurement Sequencer 123 then puts the field regulator in open loop mode and gives the alpha command that was just measured in closed loop mode in order to check accuracy. That is, in the open loop mode, the accuracy of the field current obtained is checked by the processing portion 120. If the field current, which is obtained by the field current sampling and conversion portion 146, is not within a tolerance of the expected value, the alpha command is trimmed to obtain that current. Thereafter, the processing portion 120 saves the alpha value for the next step. It should be appreciated that any suitable memory such as the memory 128, might be utilized to save such alpha value. In general, it should be appreciated that the memory 128 may be used by the various components of the controller 102 to save the various data utilized during the process of the invention. After step S6, the process passes to step S7, in which the process toggles back to a closed loop mode.

As shown in FIG. 1, in step S7 the process regulates the current to the next low point and measures the alpha value required to obtain that current. That is, the sequencer portion 123 provides the field current regulator 122 a reference equal to the next "low point" to which the field current will be stepped. When that field current is obtained in the motor field 110, the field firing command (alpha) used to obtain that current is measured. After step S7, the process then passes to step S8.

In step S8, the process operates in an open loop mode. That is, the process in accordance with this embodiment of the invention sets the open loop firing command to the alpha value found in step S7. That is, the field measurement sequencer 123 fires the motor field exciter converter 106 in an "open loop" mode with the alpha value found in step S7. If the field current, obtained utilizing the field current sampling and conversion portion 146, is not within a tolerance of the expected value, the alpha command is trimmed to obtain that current. The resultant alpha command is also saved away for the step down of current in step S10 of the process, described below. After step S8, the process passes to step S9.

In step S9 as shown in FIG. 1, the process steps the field firing command (alpha value) to the value found at the "high current". Further, the process measures the time constant necessary to obtain that current. More specifically, the field current regulator 122 is left in the "open loop" mode and the alpha command is stepped to the "high point" alpha value found in step S6. Further, the processing portion 120 measures the time constant as the field current responds to the step in alpha value. After step S9, the process passes to step S10.

As shown in FIG. 1, in step S10 the process steps the field firing command (alpha value) to the value found at the "low current". Further, in step S10, the process then measures the time constant. Thereafter, the process in accordance with this embodiment of the invention calculates the inductance and flux from the resistance and time constant. More specifically, after completion of the time constant measurement in step S9 as described above, the alpha command is stepped to the "low point" alpha value found in step S7. The time constant is again measured. The time constant obtained from this step is averaged with the time constant found in step S9. That average time constant, along with the calculated resistance from step S5, is used by the processing portion 120, and specifically the calculations portion 124, to calculate an incremental inductance and an incremental flux corresponding to the two points, or levels, to which field current was stepped.

As discussed above, step S5 through step S10 may be repeated as is desired. That is, step S5 through step S10 is repeated until incremental flux calculations between all the current data points are obtained, as is desired. Illustratively, there may be five data points. In this situation with five data points, five incremental fluxes will be obtained by performing five loops of steps S5–S10 as shown in FIG. 1. Each incremental flux calculation is calculated as a result of open loop steps of alpha to achieve steps in field current between each of the sets of current points. If there are, five current points named I1 to I5 with I1 being the lowest in value, the first step in current is from 0 to I1, the second from I1 to I2, and so on, with the last step being from I4 to I5. The total flux at the highest current point is the sum of the incremental fluxes. For example, if the resultant calculated incremental fluxes are called Flx1, Flx2 . . . . Flx5, the total flux corresponding to the highest current point, or 15, is the sum of all five incremental fluxes: Total flux=Fix1+Flx2+Flx3+Flx4+Flx5.

Once the process is iteratively looped through steps S5–S10 as is desired, the process passes to step S11.

In step S11 the data has been gathered by the processing portion 120, which allows the processing portion to perform a variety of calculations. Further, the processing portion 120 may check the validity of measurements in step S11. All incremental fluxes must be a positive value, so that the flux is always increasing with current for the plot of flux verses current.

For example, a field resistance utilized for the field current regulator 122 integral path 158 may be calculated. The last resistance calculation may be used for this calculation of field resistance, i.e., since the field will be slightly warmer by the end of the process of steps 5–10. This last measured field resistance may be used for calculation of the gain for the field regulator integral path 158.

Further, a final incremental inductance may be calculated. This final incremental inductance is a measurement between the two highest current points, i.e., 14 and 15 in the example above. The final incremental inductance is used for the proportional path gain 156 of the field current regulator 122. The field regulator integral path, 158, proportional path, 156, and firing angle conversion, 159, may then be able to run in the closed loop mode for the life of the motor using the results calculated from this process.

Further, a total (or cord) field inductance may be calculated. The total field inductance is used by the controller 102 for a number of purposes during normal running of the motor. The total field inductance may be calculated as the total flux at the highest current point divided by the value of the highest current point.

Figure 4:
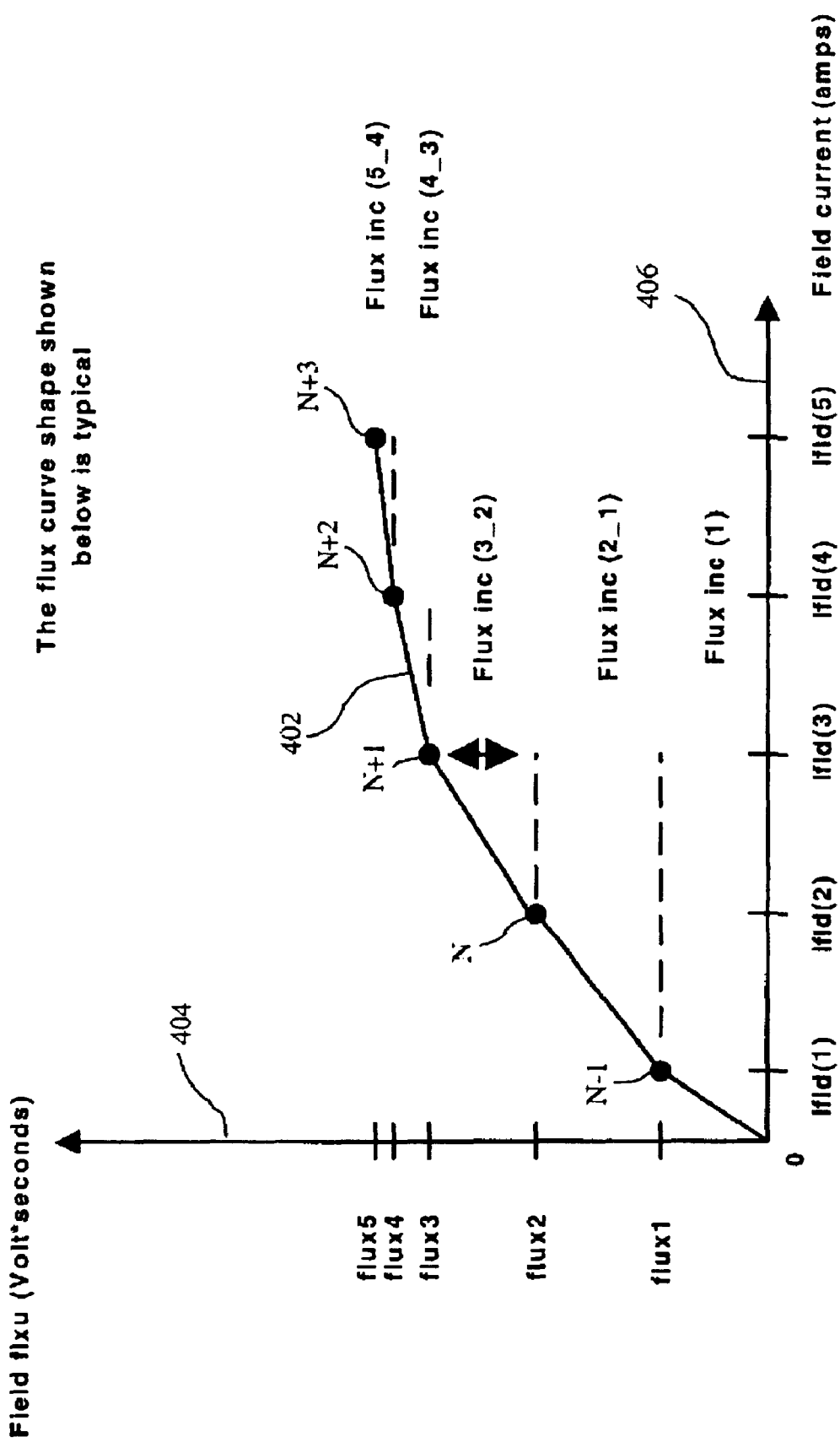
FIG. 4 is a flux curve plotting field flux against field current in accordance with one embodiment of the invention.

In accordance with one aspect of the invention, the process as described above generates a flux curve 402, as illustratively shown in FIG. 4. The flux curve 402 of FIG. 4 is a graph plotting field flux 404 against field current 406. Specifically, the flux curve 402 of FIG. 4 includes points 1 to 5 that plots five different fluxes corresponding to the five different current points generated by the controller 102. The flux for any given point is the sum of the incremental fluxes up to that particular point. Illustratively, if the current points are 1, 2, 3, 4 and 5 amps, the incremental fluxes found would correspond to the current steps made between 0 amp and 1 amp, 1 amp and 2 amps, 3 amps and 4 amps, and 4 amps and 5 amps. Note that the lfld(1) to lfld(5) indicia on the field current axis 406 are merely indicative of current points and, as shown in FIG. 4, not indicative of the particular amperage of the current points.

As described above, the calculations portion 124 performs calculations in accordance with one embodiment of the invention. For example, the calculations portion 124 calculates the incremental flux. Each incremental flux (Flux_Inc) may be calculated, for any specific point n, as follows:

$$\text{Flux\_Inc}(n) = L\_\text{Inc} * [I(n) - I(n-1)] \quad \text{Equation 1}$$

and $$L\_\text{Inc} = \text{Time\_Constant}(n) * \text{Resistance}(n) \quad \text{Equation 2}$$

Where: Flux_Inc(n) is the flux at a particular point n;
I(n) is the current at the particular point n;
Time_Constant(n) is the time constant at the particular point n; and
Resistance(n) is the resistance at the particular point n.
Further, these equations, for example, can utilize the relationship:

$$\text{Flux}(n) = \text{Flux\_Inc}(n) + \text{Flux\_Inc}(n-1) + \text{Flux\_Inc}(n-2) + \text{Flux\_Inc}(n-3) \ldots + \text{Flux\_Inc}(1) \quad \text{Equation 3}$$

Where any incremental flux is then:

$$\text{Flux\_Inc}(n) = \frac{\text{Time Constant}(n, n-1) * \text{Resistance}(n)}{[I(n) - I(n-1)]} \quad \text{Equation 4}$$

The time constant is the amount of time, for example in seconds, that it takes the field current to reach 63.2% of its final value when referenced to the current from which it was stepped.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure, which includes the attachments, is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method for determining at least one parameter of a field of a DC motor, the method comprising:
    obtaining parameters of the DC motor; and
    performing an iterative processing loop, the iterative processing loop being performed n times, the iterative processing loop including:
        regulating field current based on the parameters of the DC motor, and calculating a field resistance from a field voltage and the field current measured during the regulating of the field current;
        operating in a closed loop mode to determine a first field firing angle and a second field firing angle;
        operating in an open loop mode to determine a first time constant and a second time constant based on applying the first field firing angle and the second field firing angle; and
        determining at least one parameter of the field of the DC motor based on the first time constant, the second time constant, and the calculated field resistance.

2. The method of claim 1, wherein operating in a closed loop mode to determine a first field firing angle and a second field firing angle includes:
    regulating the current to a first high point current and measuring a first field firing angle required to obtain the first high point current; and
    regulating the current to a first low point current and measuring a second field firing angle required to obtain the first low point current.

3. The method of claim 1, wherein operating in a closed loop mode to determine a first field firing angle and a second field firing angle is done in conjunction with:
    generating a command based on at least one of the first field firing angle and the second field firing angle to generate a measured field current in an open loop mode;
    checking the measured field current to determine if the measured field current is within a tolerance of an expected value; and
    if the measured field current is not within a tolerance of an expected value, then
        trimming the at least one of the first field firing angle an the second field firing angle.

4. The method of claim 1, wherein operating in an open loop mode to determine a first time constant and a second time constant includes:
    setting an open loop firing command to the second field firing angle;
    stepping the open loop firing command to the first field firing angle and measuring the first time constant based on field current rate of change; and
    stepping the open loop firing command back to the second field firing angle and measuring the second time constant based on field current rate of change.

5. The method of claim 4, wherein setting an open loop firing command to the second field firing angle includes:
    firing the field of the DC motor in an open loop mode based on the second field firing angle;

determining if field current in the motor field is in the tolerance of an expected value; and trimming the second field firing angle, if the field current in the motor field is not in the tolerance of an expected value, so as to obtain the expected value.

6. The method of claim 1, wherein obtaining parameters of the DC motor includes inputting at least one of field rated amps, field minimum amps, motor rated power, nominal field AC input voltage, and phase relationship of field AC input voltage with main DC bridge AC input voltage.

7. The method of claim 1, wherein obtaining parameters of the DC motor includes determining an initial inductance and an initial resistance value.

8. The method of claim 7, wherein obtaining parameters of the DC motor includes:

stepping down field current to a low point utilizing an open loop firing command to measure a first initial time constant; and stepping current up, and then back down again, to measure a second initial time constant.

9. The method of claim 8, wherein the average of the first initial time constant and the second initial time constant, along with a resistance measurement, is used to calculate an initial inductance measurement.

10. The method of claim 1, wherein the at least one parameter of the field of the DC motor is an incremental flux of the field of the DC motor.

11. The method of claim 1, wherein regulating field current based on the parameters of the DC motor includes regulating the field current to a rated current of the field.

12. A system for determining at least one parameter of a field of a DC motor, the system comprising:

a processing portion that obtains parameters of the DC motor, the processing portion performing an iterative processing loop, the iterative processing loop being performed n times, the iterative processing loop including:

regulating field current based on the parameters of the DC motor, and calculating a field resistance from a field voltage and the field current measured during the regulating of the field current;

operating in a closed loop mode to determine a first field firing angle and a second field firing angle;

operating in an open loop mode to determine a first time constant and a second time constant based on applying the first field firing angle and the second field firing angle; and determining at least one parameter of the field of the DC motor based on the first time constant, the second time constant, and the calculated field resistance.

13. The system of claim 12, wherein operating in a closed loop mode to determine a first field firing angle and a second field firing angle includes:

regulating the current to a first high point current and measuring the first field firing angle required to obtain the first high point current; and regulating the current to a first low point current and measuring the second field firing angle required to obtain the first low point current.

14. The system of claim 12, wherein operating in an open loop mode to determine a first time constant and a second time constant includes: setting an open loop firing command to the second field firing angle; stepping the open loop firing command to the first field firing angle and measuring the first time constant based on field current rate of change; and stepping the open loop firing command back to the second field firing angle and measuring the second time constant based on field current rate of change.

15. A system for determining at least one parameter of a field of a DC motor, the system comprising:

means for obtaining parameters of the DC motor; and means for performing an iterative processing loop, the iterative processing loop being performed n times, the iterative processing loop including:

regulating field current based on the parameters of the DC motor, and calculating a field resistance from a field voltage and the field current measured during the regulating of the field current;

operating in a closed loop mode to determine a first field firing angle and a second field firing angle;

operating in an open loop mode to determine a first time constant and a second time constant based on applying the first field firing angle and the second field firing angle; and determining at least one parameter of the field of the DC motor based on the first time constant, the second time constant, and the calculated field resistance.

16. A method for determining at least one parameter of a field of a DC motor, the method comprising:

obtaining parameters of the DC motor; and performing an iterative processing loop, the iterative processing loop being performed n times, the iterative processing loop including:

regulating field current based on the parameters of the DC motor, and calculating a field resistance from a field voltage and the field current measured during the regulating of the field current;

operating in a closed loop mode to determine a first field firing angle and a second field firing angle, the operating in a closed loop mode including:

regulating the current to a first high point current and measuring a first field firing angle required to obtain the first high point current; and regulating the current to a first low point current and measuring a second field firing angle required to obtain the first low point current;

operating in an open loop mode to determine a first time constant and a second time constant based on applying the first field firing angle and the second field firing angle, the operating in an open loop mode including:

setting an open loop firing command to the second field firing angle;

stepping the open loop firing command to the first field firing angle and measuring the first time constant based on field current rate of change; and stepping the open loop firing command back to the second field firing angle and measuring the second time constant based on field current rate of change; and determining at least one parameter of the field of the DC motor based on the first time constant, the second time constant, and the calculated field resistance.

17. The method of claim 16, wherein obtaining parameters of the DC motor includes determining an initial inductance and an initial resistance value.

18. The method of claim 16, wherein obtaining parameters of the DC motor includes:

stepping down field current to a low point utilizing an open loop firing command to measure a first initial time constant; and stepping current up, and then back down again, to measure a second initial time constant.

19. The method of claim 16, wherein the at least one parameter of the field of the DC motor is an incremental flux of the field of the DC motor.

20. A system for determining at least one parameter of a field of a DC motor, the system comprising:
   a processing portion that obtains parameters of the DC motor, the processing portion performing an iterative processing loop, the iterative processing loop being performed n times, the iterative processing loop including:
      regulating field current based on the parameters of the DC motor, and calculating a field resistance from a field voltage and the field current measured during the regulating of the field current;
      operating in a closed loop mode to determine a first field firing angle and a second field firing angle, the operating in a closed loop mode including:
         regulating the current to a first high point current and measuring a first field firing angle required to obtain the first high point current; and
         regulating the current to a first low point current and measuring a second field firing angle required to obtain the first low point current;
      operating in an open loop mode to determine a first time constant and a second time constant based on applying the first field firing angle and the second field firing angle, the operating in an open loop mode including:
         setting an open loop firing command to the second field firing angle;
         stepping the open loop firing command to the first field firing angle and measuring the first time constant based on field current rate of change; and
         stepping the open loop firing command back to the second field firing angle and measuring the second time constant based on field current rate of change; and
      determining at least one parameter of the field of the DC motor based on the first time constant, the second time constant, and the calculated field resistance.

21. A system for determining at least one parameter of a field of a DC motor, the system comprising:
   means for obtaining parameters of the DC motor; and
   means for performing an iterative processing loop, the iterative processing loop being performed n times, the iterative processing loop including:
      regulating field current based on the parameters of the DC motor, and calculating a field resistance from a field voltage and the field current measured during the regulating of the field current;
      operating in a closed loop mode to determine a first field firing angle and a second field firing angle, the operating in a closed loop mode including:
         regulating the current to a first high point current and measuring a first field firing angle required to obtain the first high point current; and
         regulating the current to a first low point current and measuring a second field firing angle required to obtain the first low point current;
      operating in an open loop mode to determine a first time constant and a second time constant based on applying the first field firing angle and the second field firing angle, the operating in an open loop mode including:
         setting an open loop firing command to the second field firing angle;
         stepping the open loop firing command to the first field firing angle and measuring the first time constant based on field current rate of change; and
         stepping the open loop firing command back to the second field firing angle and measuring the second time constant based on field current rate of change; and
      determining at least one parameter of the field of the DC motor based on the first time constant, the second time constant, and the calculated field resistance.

* * * * *